March 17, 1942.   P. C. KEITH, JR   2,276,274
METHOD OF SYNTHESIZING HYDROCARBONS
Filed Aug. 4, 1937
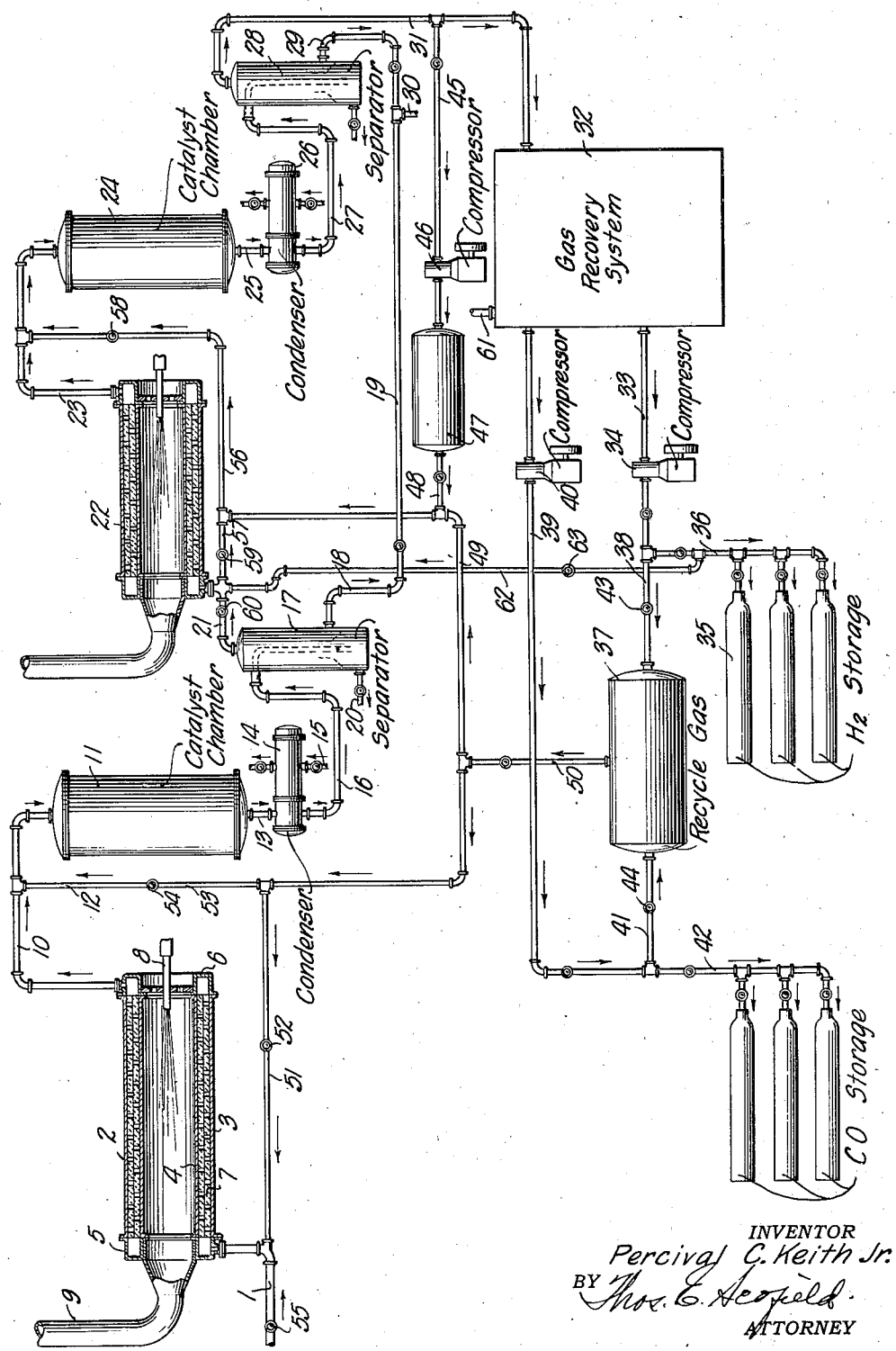
INVENTOR
Percival C. Keith Jr.
BY
ATTORNEY Patented Mar. 17, 1942

2,276,274

UNITED STATES PATENT OFFICE 2,276,274

METHOD OF SYNTHESIZING HYDROCARBONS

Percival C. Keith, Jr., Peapack, N. J., assignor to The M. W. Kellogg Company, New York, N. Y., a corporation of Delaware Application August 4, 1937, Serial No. 157,341

8 Claims. (Cl. 260—449)

My invention relates to a method of synthesizing hydrocarbons.

Investigators have synthesized hydrocarbons from mixtures of carbon monoxide and hydrogen in accordance with the following theoretical reaction:

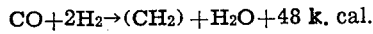

$$CO + 2H_2 \rightarrow (CH_2) + H_2O + 48 \text{ k. cal.}$$

In a typical operation, a mixture of carbon monoxide and hydrogen is passed over a catalyst at atmospheric pressure and at a temperature between 180° and 200° C.

According to one theory of the reaction, the $CH_2$ radicals combine to produce unsaturated aliphatic hydrocarbons. A considerable proportion of olefines are hydrogenated at the same time to form saturated or paraffin hydrocarbons. The volumetric consumption of hydrogen and carbon monoxide is in the approximate ratio of two to one as indicated in the above equation.

In studying this synthesis, I have observed that the ratio of consumption of carbon monoxide to hydrogen remains substantially constant even when the ratio of the two gases present in the reaction zone is varied over wide limits.

I have also observed that the hydrocarbons formed improve in quality when the ratio of carbon monoxide with respect to the hydrogen is increased. When the reaction is conducted in the presence of an excess of carbon monoxide, the octane number of the liquid hydrocarbons formed is raised. This may be due to the formation of branched chain hydrocarbons, sometimes referred to as iso-paraffins. It appears that a lean synthesis mixture comprising for example one part carbon monoxide to one part hydrogen will permit a higher space velocity for the same liquid yield per gram catalyst. It appears that, under certain circumstances, the rate determining the reaction is the rate of adsorption of carbon monoxide by the catalyst.

One object of my invention is to provide an improved method of synthesizing hydrocarbons from mixtures of carbon monoxide and hydrogen.

Another object of my invention is to provide a method of synthesizing hydrocarbons from mixtures of carbon monoxide and hydrogen, which hydrocarbons are of value as a superior motor fuel and as rich sources of iso-paraffins suitable for use in themselves and as intermediates in the synthesis of other valuable products.

Other and further objects of my invention will appear from the following description.

While I have expressed a theory as to the rationale of my invention, it is to be understood that I do not wish to be bound by this theory as my invention is based upon the improved results obtained from my method.

In the accompanying drawing which forms part of the instant specification and is to be read in conjunction therewith, the figure is a diagrammatic view of apparatus capable of carrying out the method of my invention.

In general, my invention contemplates maintaining a desired ratio of carbon monoxide to hydrogen in the mixture of gases entering the catalyst chamber. In general, my invention contemplates maintaining an excess of carbon monoxide with respect to hydrogen in a mixture of gases to be synthesized over the theoretically correct proportion of carbon monoxide to hydrogen as one is to two. Preferably, the mixture of gases entering the catalyst chamber should comprise a mixture of approximately equal volumes of carbon monoxide and hydrogen. The excess of carbon monoxide is obtained by recovering carbon monoxide from the unreacted gases leaving the synthesis zone and recycling it to the fresh feed. An excess of carbon monoxide may be obtained from an external source.

More particularly referring now to the drawing, a mixture of carbon monoxide and hydrogen in the proportion of one volume of carbon monoxide to two of hydrogen is charged through pipe 1 to a heater 2. The formation of this mixture of carbon monoxide and hydrogen in theoretically correct proportions is disclosed in my copending application, Serial No. 122,613, filed January 27, 1937. It is understood that the mixture of carbon monoxide and hydrogen or the synthesis gas has been desulphurized. Sulphur poisons the catalyst and it is important that hydrogen sulphide and organically combined sulphur be removed.

The heater 2 may comprise an outer shell 3 and an inner shell 4, having the ends thereof closed by annular manifolds 5 and 6. The annular space between shells 3 and 4 may be filled with fire brick or other refractory material 7. A burner 8, burning oil, gas or any other suitable fuel, fires the heater, the combustion gases passing out of the flue 9 to the atmosphere. The heated gases leave the heater through line 10 and pass into a catalyst chamber 11. The heating is so controlled that the mixture of gases entering the catalyst chamber 11, having regard for the recycle gases admixed with the heated gases in line 10 through line 12, is at a temperature in the vicinity of 200° C. (392° F.). This temperature is more or less critical and should be fairly closely adhered to for best results. The catalysts may be cobalt-thorium-kieselguhr, nickel-manganese-alumina-kieselguhr, or cobalt-thorium-copper-kieselguhr mixtures prepared by the reduction of metallic nitrates with hydrogen or in any other suitable manner.

I have observed that a variation in operating temperature is accompanied by variation in the quality of the products, particularly in their olefine content. I have also found it desirable to change the operating temperature somewhat when the ratio of carbon monoxide to hydrogen is changed.

The products leaving the synthesis chamber 11 through pipe 13 will comprise synthesized hydrocarbons, unreacted gases, and steam. These pass through condenser 14 in heat exchange with a cold medium supplied through line 15 and are condensed, the condensate leaving the condenser through line 16 and passing into the separator 17. The synthesized hydrocarbons are withdrawn from the separator 17 through line 18 and pass into the manifold 19. The water resulting from the steam is withdrawn through line 20. The unreacted gases leave the separator through line 21 and pass into a second heater indicated generally by the reference numeral 22. This heater is similar in construction to heater 2 but is of somewhat smaller size since the quantity of gases has been reduced by synthesis in the first synthesis zone 11. The gases heated in the heater 22 leave through line 23 and pass into a second catalyst chamber or synthesis zone 24 in which a second stage of synthesis takes place, the products leaving the synthesis zone through line 25 and passing through condenser 26 for condensation. The condensate leaves the condenser through line 27 and passes into a separator 28 from which the synthesized hydrocarbons are withdrawn through line 29 for passage into the manifold 19. The synthesized hydrocarbons leave the manifold 19 through line 30 and are passed to storage as the desired product. It is understood, of course, that these hydrocarbons may be separated into close boiling fractions by fractionation. The unreacted gases leave the separator 28 through line 31 and pass to a gas recovery system shown generally at 32. The gas recovery system forms no part of my invention and any of the methods well known to the art may be employed. For example, liquefaction methods may be employed such as the Linde cycle utilizing the Joule-Thomson effect or the Claude cycle in which gas is cooled by expansion in an engine, to recover some of the power used for compression. Low temperature fractionation is not very satisfactory for the removal of nitrogen due to the closeness of the respective boiling points of these two gases. A more suitable method for separating carbon monoxide from gas mixtures is preferably employed, as for example, chemical separation such as by scrubbing with aqueous solutions of copper salts. In this method, absorption of carbon monoxide may take place at atmospheric temperature in packed towers under pressures which may be as high as 200 atmospheres. The solution is regenerated and carbon monoxide may be recovered by heating to temperatures between 40° and 50° C., preferably under sub-atmospheric pressure. Sodium carbonate solutions may be used as scrubbing agents. Cuprous salts, in either acid or ammoniacal solutions may be employed. With ammoniacal solutions, copper carbonate and formate are the preferable salts, while with acid solutions, copper chloride appears to be the best salt.

The gas recovery system is so operated that carbon dioxide, nitrogen and uncondensable hydrocarbon gases are eliminated and may be vented through line 61.

The hydrogen recovered in the gas recovery system leaves through line 33 and is compressed by compressor 34 and may be passed either to the hydrogen storage 35 through line 36 or to the gas recycle tank 37 through line 38. The carbon monoxide leaves the gas recovery system through line 39, is compressed by compressor 40 and may be passed either to the recycle tank 37 through line 41 or to carbon monoxide storage through line 42.

The position of valve 43 in line 38 and valve 44 in line 41 are so controlled that the recycle gas will consist of approximately three volumes of carbon monoxide to one of hydrogen. This mixture, if added in equal amounts to the synthesis gas having two volumes of carbon monoxide to four volumes of hydrogen, will produce an equi-molecular charge for the synthesis stage consisting of five volumes of carbon monoxide and five volumes of hydrogen.

In the synthesis stage, four volumes of hydrogen and two volumes of carbon monoxide are consumed in the synthesis reaction so that the gas leaving the separator through line 31 will consist essentially of three volumes of carbon monoxide and one of hydrogen. This gas may be recycled directly from line 31 through line 45 by means of compressor 46 which compresses the gas and passes it into tank 47, whence it leaves through line 48 which passes into the manifold 49.

When the method is operated as a multi-stage process, hydrogen is passed through line 62 into the gases leaving the separator 17. The flow of this hydrogen is controlled by valve 63. Since the starting mixture entering the first stage after recycle has been established will have a proportion of carbon monoxide to hydrogen as one is to one, and since the synthesis takes place with a consumption of carbon monoxide to hydrogen as one is to two, the gases leaving the separator 17 will be deficient in hydrogen if the initial ratio of one to one is to be maintained. It is for this reason that I provide additional hydrogen to the gases leaving the separator 17 so that the desired leanness of the synthesis gas may be maintained.

Since it is not usually practical to operate the synthesis under conditions of complete consumption of hydrogen, it is preferred to pass the unreacted gases to the gas recovery system. The recycle gas passes into the manifold 49 from the recycle gas tank 37, through line 50. The recycle gas may be passed to the incoming gas through line 51 controlled by valve 52, to admixture with the gases being heated in heater 2. All or any desired portion of the recycle gas may be passed through line 53 controlled by valve 54 into the line 10 to control the temperature of the gases leaving the heater in addition to forming the desired synthesis gas mixture. The position of valves 54 and 52 and control valve 55 may be adjusted to give the desired mixture of synthesis gas at the desired temperature for passage into the catalyst chamber 11. Similarly, recycle gas is passed from the manifold 49 through lines 56 and 57, controlled by valves 58 and 59 respectively, it being understood that the positions of valves 60, 59, and 58 are so adjusted as to give the desired composition of synthesis gas at the proper temperature for passage into the synthesis chamber 24.

It will be seen that I have accomplished the objects of my invention. I have provided a method of synthesizing hydrocarbons from mixtures of carbon monoxide and hydrogen in which a very superior synthesis oil is produced. I am enabled to achieve the improved results by recycling unreacted gases, either directly or through a gas recovery system, to obtain the mixture of gases passed to the synthesis chamber which will produce the improved result. By recycling the gases at a point subsequent to the heater, I am enabled to control the temperature of the heated gases entering the synthesis chamber in a simple and expeditious manner. The process may be operated continuously to produce a synthesized oil rich in branched chain hydrocarbons suitable for use as a motor fuel and having a high octane number. While but two stages of synthesis are shown in the drawing, the invention contemplates the use of three or more stages. Results obtained indicate that improved operation and yields are obtained with a plurality of stages of synthesis.

It will be understood that certain features and sub-combinations are of utility and may be employed without reference to other features and sub-combinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. A method of synthesizing hydrocarbons from mixtures of carbon monoxide and hydrogen in which an excess of carbon monoxide with respect to hydrogen is maintained, including the steps of heating a mixture of carbon monoxide and hydrogen to a synthesizing temperature, contacting the heated mixture with a hydrogenation catalyst in a synthesis zone, separating unreacted gases to obtain a fraction predominating in carbon monoxide and admixing at least a part of said fraction with the carbon monoxide and hydrogen being fed to the synthesis zone to maintain the desired excess of carbon monoxide with respect to hydrogen during the synthesis.

2. A method of synthesizing hydrocarbons from mixtures of carbon monoxide and hydrogen in which an excess of carbon monoxide with respect to hydrogen is maintained, including the steps of heating a mixture of carbon monoxide and hydrogen to a synthesizing temperature, contacting the heated mixture with a hydrogenation catalyst in a synthesis zone, separating unreacted gases into fractions preponderantly carbon monoxide and hydrogen respectively, admixing desired proportions of carbon monoxide and hydrogen to form a recycle gas containing a preponderance of carbon monoxide and admixing recycle gas thus obtained with carbon monoxide and hydrogen being fed to the synthesis zone to maintain the desired excess of carbon monoxide with respect to hydrogen during the synthesis.

3. A method of synthesizing hydrocarbons from a mixture of carbon monoxide and hydrogen in which an excess of carbon monoxide with respect to hydrogen is maintained during the synthesis including the steps of heating a mixture of carbon monoxide and hydrogen to a synthesizing temperature, contacting the heated gases with a hydrogenation catalyst in a synthesizing zone, separating unreacted gases from the synthesis products, reheating the separated gases to a synthesis temperature, contacting the reheated gases with a hydrogenation catalyst in a second synthesis zone, separating unreacted gases from the synthesis products into fractions preponderantly carbon monoxide and hydrogen to form a recycle gas containing a preponderance of carbon monoxide, passing said recycle gas to the heated gases passing to said first and second synthesis zone to maintain the desired excess of carbon monoxide to hydrogen during the synthesis.

4. A method as in claim 2 in which said recycle gas is introduced to the mixture of carbon monoxide and hydrogen before it enters the heating step.

5. A method as in claim 2 in which said recycle gas is introduced into the gas leaving the heating step.

6. A method as in claim 2 in which the recycle gas is introduced partly to the mixture of carbon monoxide and hydrogen entering the heating zone and partly to the heated carbon monoxide and hydrogen leaving the heating zone.

7. A method as in claim 2 in which the mixture of carbon monoxide and hydrogen is heated to a temperature between 180° C. and 200° C. and said catalyst in the synthesis zone is selected from the following group: cobalt-thorium-kieselguhr, nickel-manganese-alumina-kieselguhr, cobalt-thorium-copper-kieselguhr.

8. A method as in claim 3 in which the mixture of carbon monoxide and hydrogen is heated to a temperature between 180° C. and 200° C. and said catalyst in the synthesis zone is selected from the following group: cobalt-thorium-kieselguhr, nickel-manganese-alumina-kieselguhr, cobalt-thorium-copper-kieselguhr.

PERCIVAL C. KEITH, JR.